United States Patent
Liu

(10) Patent No.: US 11,320,930 B2
(45) Date of Patent: May 3, 2022

(54) ELECTRONIC PAPER DISPLAY AND DRIVING METHOD THEREOF

(71) Applicant: E Ink Holdings Inc., Hsinchu (TW)

(72) Inventor: Wen-Pin Liu, Hsinchu (TW)

(73) Assignee: E Ink Holdings Inc., Hsinchu (TW)

(*) Notice: Subject to any disclaimer, the term of this patent is extended or adjusted under 35 U.S.C. 154(b) by 0 days.

(21) Appl. No.: 17/182,127

(22) Filed: Feb. 22, 2021

(65) Prior Publication Data

US 2021/0318775 A1 Oct. 14, 2021

(30) Foreign Application Priority Data

Apr. 14, 2020 (TW) .................................. 109112430

(51) Int. Cl.
*G06F 3/041* (2006.01)
*G09G 5/02* (2006.01)

(52) U.S. Cl.
CPC .......... *G06F 3/0416* (2013.01); *G06F 3/0412* (2013.01); *G09G 5/02* (2013.01); *G09G 2354/00* (2013.01)

(58) Field of Classification Search
CPC ....... G06F 3/0416; G06F 3/0412; G09G 5/02; G09G 2354/00
See application file for complete search history.

(56) References Cited

U.S. PATENT DOCUMENTS

| 6,757,424 | B2 | 6/2004 | Love |
| 10,120,465 | B2 | 11/2018 | Tomokiyo et al. |
| 10,282,033 | B2 | 5/2019 | Crounse et al. |
| 2013/0100103 | A1 | 4/2013 | Lai et al. |
| 2014/0118295 | A1* | 5/2014 | Motoi ................. G06F 3/04883 345/174 |

FOREIGN PATENT DOCUMENTS

| CN | 101542361 | 9/2009 |
| CN | 101788865 | 7/2010 |
| CN | 107608619 | 1/2018 |
| TW | 201101137 | 1/2011 |
| TW | 201224865 | 6/2012 |
| TW | 201333758 | 8/2013 |
| TW | 201443743 | 11/2014 |

OTHER PUBLICATIONS

"Office Action of Taiwan Counterpart Application", dated Jun. 25, 2021, p. 1-p. 4.

* cited by examiner

*Primary Examiner* — Peter D McLoone
(74) *Attorney, Agent, or Firm* — JCIPRNET

(57) ABSTRACT

An electronic paper display and a driving method thereof are provided. The electronic paper display includes an electronic paper display panel, a touch panel and a processing circuit. The electronic paper display panel is configured to display a display screen with a background in a first color. The touch panel is integrated with the electronic paper display panel and configured to output a first touch coordinate of a current touch. The processing circuit is configured to drive the electronic paper display panel to display a first touch track having a second color and corresponding to the first touch coordinate and a previous touch coordinate. The processing circuit further drives, according to the first touch track and a previous touch track, the electronic paper display panel to display a predicted track having a third color.

10 Claims, 4 Drawing Sheets

ELECTRONIC PAPER DISPLAY AND DRIVING METHOD THEREOF

CROSS-REFERENCE TO RELATED APPLICATION

This application claims the priority benefit of Taiwan application serial no. 109112430, filed on Apr. 14, 2020. The entirety of the above-mentioned patent application is hereby incorporated by reference herein and made a part of this specification.

BACKGROUND OF THE DISCLOSURE

1. Field of the Disclosure

The disclosure relates to a display technology, and in particular, to an electronic paper display and a driving method thereof.

2. Description of Related Art

An electronic paper display is a new type of display device, which is light and thin, durable, and low in power consumption in line with energy saving and environmental protection, and has been widely used in the market for an electronic reader (for example, an e-book or an electronic newspaper) or other electronic elements (for example, an electronic tag).

In some applications, functions of an electronic paper display panel and a touch panel can be integrated to enable a user to touch and display a touch result through the electronic paper display. For example, the user may use a touch medium (for example, a stylus or a finger) to write on the touch panel to display written content on the display panel. It should be noted that in the conventional technology, a touch track of a touch medium on a touch panel at a next time point is predicted according to a previous touch track at a previous time point, to display a line segment drawn by the touch medium earlier, thereby reducing a delay during writing.

In this regard, on the premise that the display panel uses white color as a display background, a conventional electronic paper display displays the predicted touch track on the display panel by using a black line segment. When the predicted touch track is different from an actual touch track, the displayed predicted touch track is further converted into white.

However, in the process of converting the wrongly predicted touch track from black into white, it takes longer processing time in terms of characteristics of the electronic paper display panel. In addition, user's viewing quality is affected if the predicted touch track is displayed on the display panel in black. Therefore, how to effectively reduce the time for processing a touch track with a wrong prediction and improve the display quality of a display panel is an important issue for persons skilled in the art.

SUMMARY OF THE DISCLOSURE

The disclosure provides an electronic paper display and a driving method thereof, to effectively reduce the time for processing a touch track with a wrong prediction and improve the display quality of an electronic paper display panel.

The electronic paper display in the disclosure includes an electronic paper display panel, a touch panel, and a processing circuit. The electronic paper display panel is configured to display a display screen with a background in a first color. The touch panel is integrated with the electronic paper display panel and is configured to output a first touch coordinate of a current touch. The processing circuit is coupled to the electronic paper display panel and the touch panel and is configured to drive the electronic paper display panel to display a first touch track having a second color and corresponding to the first touch coordinate and a previous touch coordinate. The processing circuit further drives, according to the first touch track and a previous touch track, the electronic paper display panel to display a predicted track having a third color.

The driving method of an electronic paper display in the disclosure includes: displaying a display screen with a background in a first color by using an electronic paper display panel; outputting a first touch coordinate of a current touch by using a touch panel; driving the electronic paper display panel to display a first touch track having a second color and corresponding to the first touch coordinate and a previous touch coordinate; and driving, according to the first touch track and a previous touch track, the electronic paper display panel to display a predicted track having a third color.

Based on the above, according to the electronic paper display and the driving method thereof in the embodiments of the disclosure, a touch track of a touch medium on a touch panel can be predicted, and the predicted touch track is displayed on an electronic paper display panel in a gray scale. In this way, the predicted touch track displayed on the electronic paper display panel in the disclosure is less likely to be noticed by user's eyes, thereby improving user's viewing quality. In addition, the disclosure can more effectively reduce the time for processing a touch track with a wrong prediction.

DESCRIPTION OF THE EMBODIMENTS

Figure 1:
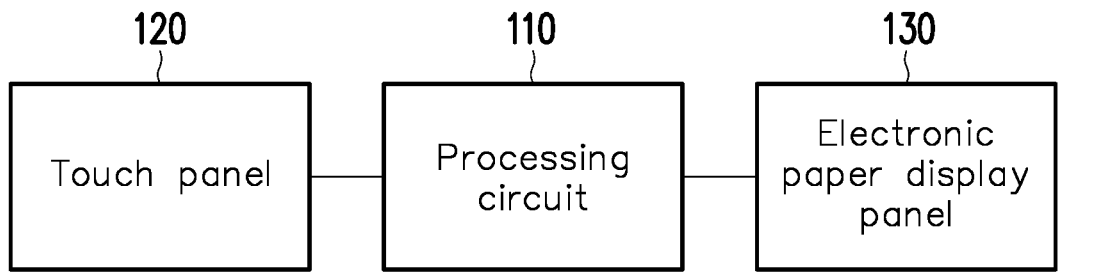
FIG. 1 is a block diagram of an electronic paper display according to an embodiment of the disclosure.

To make the content of the disclosure more comprehensible, embodiments are described below as examples according to which the disclosure can indeed be implemented. Wherever possible, the same reference numbers are used in the drawings and the description to refer to the same or like parts, components or steps.

FIG. 1 is a block diagram of an electronic paper display 100 according to an embodiment of the disclosure. Referring to FIG. 1, the electronic paper display 100 includes a processing circuit 110, a touch panel 120, and an electronic paper display panel 130. In the present embodiment, the touch panel 120 may be integrated with the electronic paper display panel 130, and the touch panel 120 may overlap under the electronic paper display panel 130, but the disclosure is not limited thereto.

The touch panel 120 may be, for example, an electromagnetic resonance (EMR) or capacitive induction touch panel, but the disclosure is not limited thereto. The touch panel 120 may generate a touch result according to a touch behavior of a touch medium (for example, a stylus or a finger), and then report the touch result to the processing circuit 110.

In the embodiment, the electronic paper display panel 130 includes a plurality of pixels, and these pixels respectively correspond to a plurality of cells arranged in an array. These cells are, for example, a microcup structure, and have electrophoretic particles in two colors (for example, a white electrophoretic particle and a black electrophoretic particle, but the disclosure is not limited thereto).

In addition, in the embodiment, the processing circuit 110 is coupled between the touch panel 120 and the electronic paper display panel 130. The processing circuit 110 may generate a driving signal according to the touch result and send the signal to the electronic paper display panel 130, to drive a plurality of electrophoretic particles in the cells. In the embodiment, the processing circuit 110 drives the electrophoretic particles to move in the cells by applying a voltage, so that each pixel of the electronic paper display panel 130 can display black, white, a gray scale, or a specific color.

In detail, in the embodiment, a single pixel of the electronic paper display panel 130 may include an upper electrode layer, a plurality of cells, and a driving substrate. These cells may be arranged between the upper electrode layer and the driving substrate, and a display side of these cells is close to the upper electrode layer. The upper electrode layer may be, for example, a transparent electrode layer, and the driving substrate may include, for example, a driving transistor. Moreover, the driving substrate may receive, through the driving transistor, the driving signal provided by the processing circuit 110, to drive the white electrophoretic particle and the black electrophoretic particle to move in these cells.

For example, in the embodiment, the white electrophoretic particle may be negatively charged, and the black electrophoretic particle may be positively charged. When the driving substrate applies a negative voltage according to the driving signal, the negatively charged white electrophoretic particle moves toward the display side of the cell, so that the electronic paper display panel 130 can display a display screen in white according to a moving direction of the electrophoretic particle. On the contrary, when the driving substrate applies a higher positive voltage according to the driving signal, the positively charged black electrophoretic particle moves toward the display side of the cell, so that the electronic paper display panel 130 can display a display screen in black according to a moving direction of the electrophoretic particle.

It should be noted that in the embodiment, the processing circuit 110 may adjust a voltage of the driving signal to push the black electrophoretic particle and the white electrophoretic particle to specific equal positions in the cell, so that the electronic paper display panel 130 displays a color whose gray scale value is not black or white.

Figure 2:
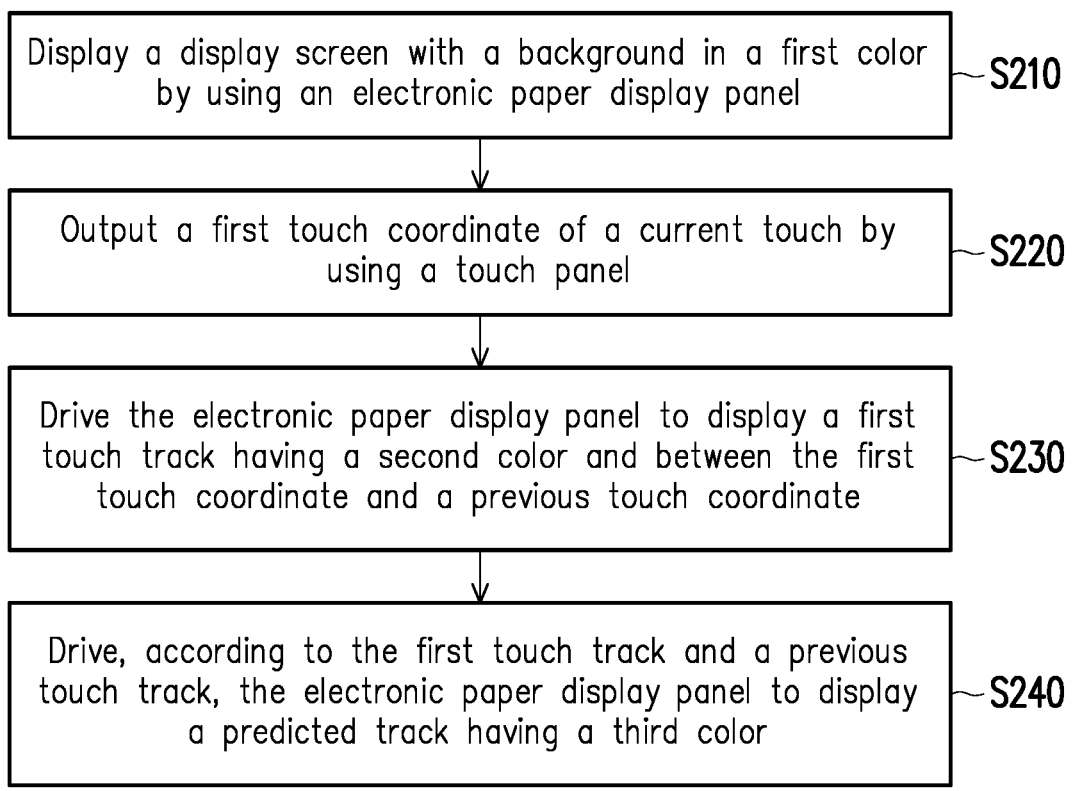
FIG. 2 is a flowchart of a driving method of an electronic paper display according to an embodiment of the disclosure.
Figure 3:
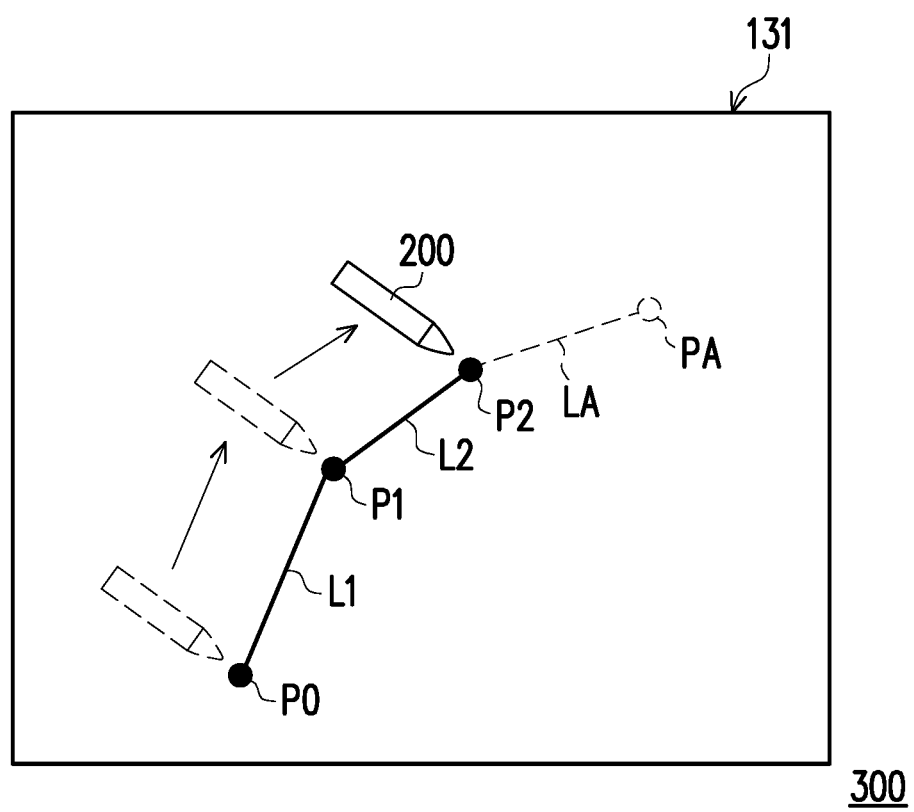
FIG. 3 is a schematic diagram of a touch display scenario for displaying a predicted track on an electronic paper display panel according to an embodiment of the disclosure.

For details of the operation of predicting the touch track of the touch medium by the electronic paper display 100, refer to FIG. 1, FIG. 2 and FIG. 3. FIG. 2 is a flowchart of a driving method of an electronic paper display 100 according to an embodiment of the disclosure. FIG. 3 is a schematic diagram of a touch display scenario 300 for displaying a predicted track LA on an electronic paper display panel 130 according to an embodiment of the disclosure.

In detail, in step S210, an electronic paper display 100 may display a display screen 131 with a background in a first color (for example, white) through an electronic paper display panel 130, but the disclosure is not limited thereto. In step S220, the electronic paper display 100 may output a first touch coordinate P2 of a current touch by using a touch panel 120.

For example, in the embodiment, a user may use a stylus 200 to write on the touch panel 120 (for example, a line segment shown in FIG. 3, but the disclosure is not limited thereto), and may use a touch coordinate P0 as an initial touch coordinate to draw to the first touch coordinate P2 along touch tracks L1 and L2 at a first time point T1. In this case, the touch panel 120 may report the touch result to the processing circuit 110 at the first time point T1.

Then, in step S230, the processing circuit 110 may drive the electronic paper display panel 130 to display a first touch track having a second color (for example, black) and corresponding to the first touch coordinate P2 and a previous touch coordinate.

Further, after the stylus 200 draws from the touch coordinates P0 along the touch tracks L1 and L2 to the first touch coordinates P2, the processing circuit 110 may generate a driving signal with a positive voltage and send the signal to the electronic paper display panel 130 according to the touch result, so that a positively charged black electrophoretic particle moves toward a display side of an cell. In this case, the processing circuit 110 may display the first touch track L2 corresponding to the first touch coordinate P2 and the previous touch coordinate P1 and a previous touch track L1 corresponding to the touch coordinate P0 and the previous touch coordinate P1 on the display screen 131 of the electronic paper display panel 130 in a second color (for example, black).

Then, in step S240, the processing circuit 110 may drive the electronic paper display panel 130 to display a predicted track LA having a third color (for example, a gray scale) according to the first touch track L2 and the previous touch track L1.

For example, in some design requirements (in some embodiments), at a second time point T2 after the first time point T1 (that is, after the touch panel 120 outputs the first touch coordinate P2 of the current touch), the processing circuit 110 may predict, according to the first touch track L2 and the previous touch track L1 by using an algorithm, a touch coordinate of a next touch output by the touch panel 120 (in other words, predict a touch coordinate PA), and a touch track (the predicted track LA) between the first touch coordinate P2 of the current touch and the touch coordinate of the next touch.

In addition, the processing circuit 110 may generate a driving signal according to the prediction result and send the signal to the electronic paper display panel 130 after completing the prediction of the predicted track LA, to respectively push a black electrophoretic particle and a white electrophoretic particle to specific equal positions in the cell. In this case, the processing circuit 110 may display the predicted track LA in a third color (for example, a gray scale) on the display screen 131 of the electronic paper display panel 130.

In some other design requirements (in some other embodiments), at the second time point T2, the processing circuit 110 may also predict, according to the first touch track L2 by using the algorithm, the touch coordinate of the next touch output by the touch panel 120 (in other words, predict the touch coordinate PA), and the touch track (the predicted track LA) between the first touch coordinate P2 of the current touch and the touch coordinate of the next touch. Moreover, the processing circuit 110 may also display the predicted track LA in the third color (for example, a gray scale) on the display screen 131 of the electronic paper display panel 130.

In other words, in the touch display scenario 300 shown in FIG. 3, the processing circuit 110 may predict, according to one or more touch tracks (for example, the touch tracks L1, L2) before the first touch coordinate P2 of the current touch and/or two or more touch coordinates (for example, the touch coordinate P0 to P2) by using the algorithm, the touch coordinate of the next touch output by the touch panel 120 (in other words, predict the touch coordinate PA), and the touch track (the predicted track LA) between the first touch coordinate P2 of the current touch and the touch coordinate of the next touch.

It should be noted that the algorithm in the embodiment may be, for example, a Kalman filter or an extrapolation, but the disclosure is not limited thereto. In addition, in the embodiment, a gray scale of the third color may be between the first color and the second color. The first color is, for example, white, the second color is, for example, black, and the third color is, for example, a gray scale, but the disclosure is not limited thereto.

According to the description of the touch display scenario 300 shown in FIG. 3 above, it can be known that the electronic paper display 100 in the embodiment may predict the touch coordinate PA and the predicted track LA by calculation through the processing circuit 110, and display the predicted touch track LA on the electronic paper display panel 130 in the third color (for example, a gray scale). In this way, compared to the conventional technology in which a predicted touch track is displayed on a display panel in black, the predicted touch track LA displayed on the electronic paper display panel 130 in the embodiment is less likely to be noticed by user's eyes, thereby improving user's viewing quality.

Figure 4:
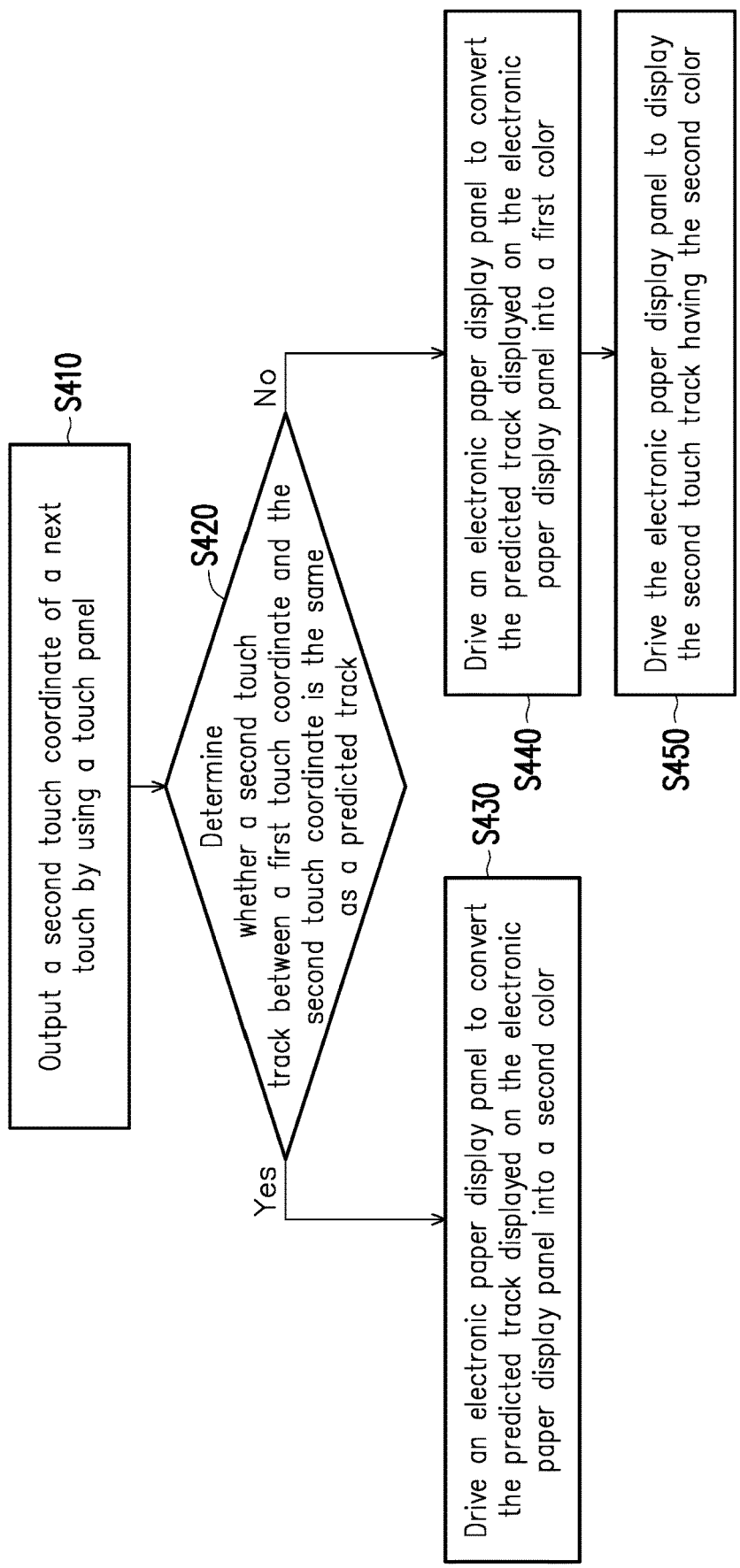
FIG. 4 is a flowchart of an operation procedure of a processing circuit shown in FIG. 1 according to an embodiment of the disclosure.
Figure 5:
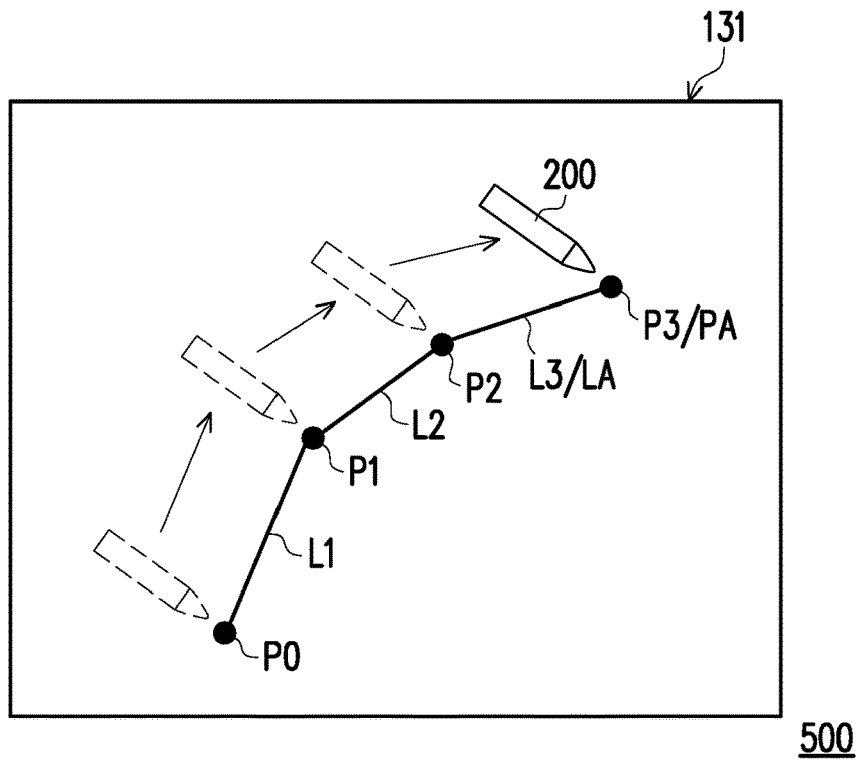
FIG. 5 is a schematic diagram of a touch display scenario when a second touch track is the same as a predicted track according to an embodiment of the disclosure.
Figure 6:
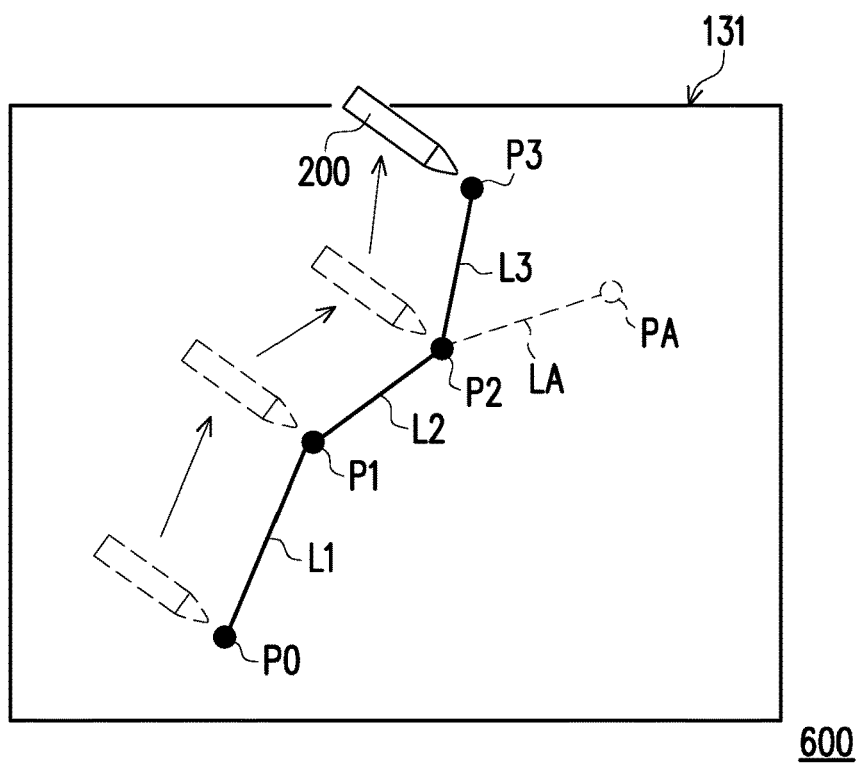
FIG. 6 is a schematic diagram of a touch display scenario when a second touch track is different from a predicted track according to an embodiment of the disclosure.

For details of the operation of determining whether the predicted track LA predicted by the processing circuit 110 is the same as a touch track (a second touch track L3) actually drawn by the stylus 200 from the first touch coordinate P2 to the touch coordinate (a second touch coordinate P3) of the next touch, refer to FIG. 1, FIG. 4, FIG. 5, and FIG. 6. FIG. 4 is a flowchart of an operation procedure of a processing circuit 110 shown in FIG. 1 according to an embodiment of the disclosure. FIG. 5 is a schematic diagram of a touch display scenario 500 when a second touch track L3 is the same as a predicted track LA according to an embodiment of the disclosure. FIG. 6 is a schematic diagram of a touch display scenario 600 when a second touch track L3 is different from a predicted track LA according to an embodiment of the disclosure.

In the embodiment, the electronic paper display 100 may perform the operation action of step S410 shown in FIG. 4 after performing the operation action of step S240 shown in FIG. 2. Herein, referring to FIG. 1, FIG. 4, and FIG. 5, in step S410, the electronic paper display 100 may output a second touch coordinate P3 of a next touch through the touch panel 120.

In particular, after the processing circuit 110 enables the predicted track LA to be displayed on the electronic paper display panel 130 in the third color (for example, a gray scale) at the second time point T2, the stylus 200 may draw from the first touch coordinate P2 to the second touch coordinate P3 along the second touch track L3 at a third time point after the second time point T2. In this case, the touch panel 120 may report the touch result to the processing circuit 110 at the third time point T3. The second touch track L3 in the embodiment may be expressed as a touch track actually drawn by the stylus 200 for the next touch.

In step S420, the processing circuit 110 may determine whether the second touch track L3 between the first touch coordinate P2 and the second touch coordinate P3 is the same as the predicted track LA. For example, the processing circuit 110 may determine whether the second touch track L3 actually drawn by the stylus 200 at the third time point T3 and the predicted track LA calculated by the processing circuit 110 at the second time point T2 have an overlapping part.

When the processing circuit 110 determines that the second touch track L3 and the predicted track LA are the same track (that is, the second touch track L3 and the predicted track LA have an overlapping part), the processing circuit 110 continues to perform an operation in step S430. On the contrary, when the processing circuit 110 determines that the second touch track L3 and the predicted track LA are different tracks (that is, the second touch track L3 and the predicted track LA have no overlapping part), the processing circuit 110 continues to perform operations in step S440 and step S450.

Herein, referring to FIG. 1, FIG. 4, and FIG. 5, in step S430, the processing circuit 110 may drive the electronic paper display panel 130 to convert the predicted track LA displayed by the electronic paper display panel 130 into a second color (for example, black).

In detail, in the touch display scenario 500, when the processing circuit 110 determines that the second touch track L3 and the predicted track LA have an overlapping part, the processing circuit 110 may generate a driving signal with a positive voltage according to the determining result and send the signal to the electronic paper display panel 130, so that a black electrophoretic particle in a pixel corresponding to the part of the predicted track LA which overlaps the second touch track L3, to move from an original specific equal position toward a display side of an cell.

Thereby, the processing circuit 110 can convert the part of the predicted track LA which is displayed on the electronic paper display panel 130 and overlaps the second touch track L3 from the third color (for example, a gray scale) into the second color (for example, black), to be displayed on the display screen 131.

Herein, referring to FIG. 1, FIG. 4, and FIG. 6, in step S440, the processing circuit 110 may drive the electronic paper display panel 130 to convert the predicted track LA displayed by the electronic paper display panel 130 into a first color (for example, white).

In detail, in the touch display scenario 600, when the processing circuit 110 determines that the second touch track L3 and the predicted track LA have no overlapping part, the processing circuit 110 may generate a driving signal with a negative voltage according to the determining result and send the signal to the electronic paper display panel 130, so that a white electrophoretic particle in a pixel corresponding to a part of the predicted track LA which does not overlap the second touch track L3, to move from an original specific equal position toward the display side of the cell.

Thereby, the processing circuit 110 can convert the part of the predicted track LA which is displayed on the electronic paper display panel 130 and does not overlap the second touch track L3 from the third color (for example, a gray scale) into the first color (for example, white), to be displayed on the display screen 131.

Then, in step S450 after step S440, the processing circuit 110 may further drive the electronic paper display panel 130 to display the second touch track L3 having the second color (for example, black).

In particular, when the processing circuit 110 does not predict an actual touch track (the second touch track L3) between the first touch coordinate P2 and the second touch coordinate P3 of the stylus 200, the processing circuit 110 may generate a driving signal with a positive voltage according to the determining result and send the signal to the electronic paper display panel 130, so that a black electrophoretic particle in a pixel corresponding to a part of the second touch track L3 which does not overlap the predicted track LA moves toward the display side of the cell.

Thereby, the processing circuit 110 can convert the part of the second touch track L3 which is displayed on the electronic paper display panel 130 and does not overlap the predicted track LA from the first color (for example, white) into the second color (for example, black), to be displayed on the display screen 131.

According to the description of the touch display scenario 600 shown in FIG. 6 above, it can be known that the predicted touch track LA in the present embodiment is displayed on the electronic paper display panel 130 in the third color (for example, a gray scale) at the second time point T2, and a white electrophoretic particle in a pixel corresponding to the predicted touch track LA has been pushed to a specific equal position in the cell in advance. Therefore, when it is determined that the second touch track L3 and the predicted track LA do not have an overlapping part, at the third time point T3, the processing circuit 110 only needs to move the white electrophoretic particle in the corresponding pixel from the original specific equal position toward the display side of the cell, so that a part of the predicted track LA which does not overlap the second touch track L3 can be converted from the third color (for example, a gray scale) into the first color (for example, white), to be displayed on the electronic paper display panel 130.

Thereby, compared to the conventional technology in which the part of the predicted track which does not overlap with the actual touch track needs to be converted from the original black to white to move the white electrophoretic particle from a driving substrate toward the display side of the cell, the processing circuit 110 in the present embodiment can more effectively reduce the time for processing a touch track with a wrong prediction and can more quickly convert the predicted track LA displayed on the electronic paper display panel 130 into the first color (for example, white).

In view of the above, according to the electronic paper display and the driving method thereof in the embodiments of the disclosure, a touch track of a touch medium on a touch panel can be predicted, and the predicted touch track is displayed on an electronic paper display panel in a gray scale. In this way, the predicted touch track displayed on the electronic paper display panel in the disclosure is less likely to be noticed by user's eyes, thereby improving user's viewing quality. In addition, the disclosure can more effectively reduce the time for processing a touch track with a wrong prediction.

What is claimed is:

1. An electronic paper display, comprising:
    an electronic paper display panel configured to display a display screen with a background in a first color;
    a touch panel integrated with the electronic paper display panel and configured to output a first touch coordinate of a current touch; and
    a processing circuit coupled to the electronic paper display panel and the touch panel and configured to drive the electronic paper display panel to display a first touch track having a second color and corresponding to the first touch coordinate and a previous touch coordinate, wherein
    the processing circuit further drives, according to the first touch track and a previous touch track, the electronic paper display panel to display a predicted track having athird color,
    the processing circuit further determines that a second touch track is different from the predicted track when the second touch track and the predicted track have no overlapping part, wherein the second touch track is between the first touch coordinate and a second touch coordinate of a next touch.

2. The electronic paper display according to claim 1, wherein the touch panel outputs the second touch coordinate of the next touch, and when e processing circuit determines that the second touch track between the first touch coordinate and the second touch coordinate is the same as the predicted track, the processing circuit drives the electronic paper display panel to convert the predicted track displayed on the electronic paper display panel into the second color.

3. The electronic paper display according to claim 2, wherein when the processing circuit determines that the second touch track is different from the predicted track, the processing circuit drives the electronic paper display panel to convert the predicted track displayed on the electronic paper display panel into the first color.

4. The electronic paper display according to claim 3, wherein when the processing circuit determines that the second touch track is different from the predicted track, the processing circuit further drives the electronic paper display panel to display the second touch track having the second color.

5. The electronic paper display according to claim 1, wherein a gray scale of the third color is between the first color and the second color.

6. A driving method of an electronic paper display, comprising:
    displaying a display screen with a background in a first color by using an electronic paper display panel;
    outputting a first touch coordinate of a current touch by using a touch panel;
    driving the electronic paper display panel to display a first touch track having a second color and corresponding to the first touch coordinate and a previous touch coordinate; and
    driving, according to the first touch track and a previous touch track, the electronic paper display panel to display a predicted track having a third color,
    when a second touch track and the predicted track have no overlapping part, determining that the second touch track is different from the predicted track, wherein the second touch track is between the first touch coordinate and a second touch coordinate of a next touch.

7. The driving method according to claim 6, further comprising:
    outputting the second touch coordinate of the next touch by using the touch panel;
    determining whether the second touch track between the first touch coordinate and the second touch coordinate is the same as the predicted track; and when the second touch track is the same as the predicted track, driving the electronic paper display panel to convert the predicted track displayed on the electronic paper display panel into the second color.

8. The driving method according to claim 7, further comprising:

when the second touch track is different from the predicted track, driving the electronic paper display panel to convert the predicted track displayed on the electronic paper display panel into the first color.

9. The driving method according to claim 8, further comprising:

when the second touch track is different from the predicted track, further driving the electronic paper display panel to display the second touch track having the second color.

10. The driving method according to claim 6, wherein a gray scale of the third color is between the first color and the second color.

* * * * *